(12) United States Patent
Dieberger et al.

(10) Patent No.: US 7,984,388 B2
(45) Date of Patent: Jul. 19, 2011

(54) SYSTEM AND METHOD FOR PARTIALLY COLLAPSING A HIERARCHICAL STRUCTURE FOR INFORMATION NAVIGATION

(75) Inventors: Andreas Dieberger, Los Gatos, CA (US); Beverly L. Harrison, Menlo Park, CA (US); Thomas P Moran, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 11/009,126

(22) Filed: Dec. 10, 2004

(65) Prior Publication Data

US 2006/0129569 A1 Jun. 15, 2006

(51) Int. Cl.
*G06F 3/048* (2006.01)
(52) U.S. Cl. ........ 715/853; 715/854; 707/797; 707/803; 707/828
(58) Field of Classification Search .................. 715/854, 715/853; 707/797, 803, 828–831
See application file for complete search history.

(56) References Cited

U.S. PATENT DOCUMENTS

| | | | | |
|---|---|---|---|---|
| 4,839,853 A | | 6/1989 | Deerwester et al. | 707/5 |
| 5,515,487 A | * | 5/1996 | Beaudet et al. | 345/440 |
| 5,950,168 A | * | 9/1999 | Simborg et al. | 705/3 |
| 6,252,597 B1 | * | 6/2001 | Lokuge | 715/841 |
| 6,341,280 B1 | * | 1/2002 | Glass et al. | 707/754 |
| 6,348,935 B1 | * | 2/2002 | Malacinski et al. | 715/853 |
| 6,484,190 B1 | * | 11/2002 | Cordes et al. | 715/207 |
| 7,242,413 B2 | * | 7/2007 | Chu et al. | 345/619 |
| 7,343,568 B2 | * | 3/2008 | Jiang et al. | 715/854 |
| 7,360,175 B2 | * | 4/2008 | Gardner et al. | 715/854 |
| 7,363,593 B1 | * | 4/2008 | Loyens et al. | 715/853 |
| 2002/0101450 A1 | * | 8/2002 | Magendanz et al. | 345/764 |
| 2003/0041147 A1 | * | 2/2003 | van den Oord et al. | 709/227 |
| 2003/0202019 A1 | * | 10/2003 | Detweiler et al. | 345/853 |
| 2003/0218641 A1 | * | 11/2003 | Longobardi | 345/853 |
| 2004/0119745 A1 | * | 6/2004 | Bartek et al. | 345/763 |
| 2004/0177319 A1 | * | 9/2004 | Horn | 715/501.1 |
| 2004/0210849 A1 | * | 10/2004 | Becker | 715/815 |
| 2004/0239683 A1 | * | 12/2004 | Chu et al. | 345/619 |

(Continued)

OTHER PUBLICATIONS

George W. Furnas et al., "Information Retrieval using a Singular Value Decomposition Model of Latent Semantic Structure," SIGIR 1988: 465-480 (3 pages).

(Continued)

*Primary Examiner* — Ba Huynh
(74) *Attorney, Agent, or Firm* — Jon A. Gibbons; Fleit Gibbons Gutman Bongini & Bianco PL

(57) ABSTRACT

A partially collapsing hierarchical display system aids information navigation by providing a dynamic mechanism for labeling items with one or more states. In one embodiment, states comprise "hidden", "visible" and "unmarked". An expanded list of items displays all items. A partially expanded list of items displays all visible and unmarked items, removing hidden items from the display. A further collapsed list of items displays all visible items. A completely collapsed list of items hides all items. Users customize the amount of detail displayed in a sub-tree, reducing the display size of the sub-tree. Expansion of a hierarchical structure is combined with filtering, allowing users to partially collapse or partially expand a sub-tree structure. Partially collapsed lists comprise one or more focus points, allowing users to view several relevant sections of a hierarchical structure concurrently. Displayed sizes or other visual characteristics of items within the hierarchical structure are automatically adjusted to reflect the states designated by the user.

24 Claims, 8 Drawing Sheets

U.S. PATENT DOCUMENTS

| | | | | |
|---|---|---|---|---|
| 2005/0076312 | A1* | 4/2005 | Gardner et al. | 715/853 |
| 2005/0132304 | A1* | 6/2005 | Guido et al. | 715/853 |
| 2005/0177801 | A1* | 8/2005 | Vronay et al. | 715/828 |
| 2005/0198582 | A1* | 9/2005 | Hennum et al. | 715/772 |
| 2005/0231512 | A1* | 10/2005 | Niles et al. | 345/473 |
| 2005/0283765 | A1* | 12/2005 | Warren et al. | 717/131 |
| 2005/0285965 | A1* | 12/2005 | Zimmer et al. | 348/333.11 |
| 2005/0289155 | A1* | 12/2005 | Nan et al. | 707/100 |
| 2007/0150485 | A1* | 6/2007 | Uittenbogaard | 707/100 |
| 2007/0198930 | A1* | 8/2007 | Chu et al. | 715/713 |
| 2008/0016474 | A1* | 1/2008 | Guido et al. | 715/854 |

OTHER PUBLICATIONS

Laurence Brothers et al., "Supporting Informal Communication Via Ephemeral Interest Groups,". CSCW 92 Proceedings, Nov. 1992.

G. Furnas et al., "Illusions of Infinity: Feedback for Infinite Worlds," CHI Letters, vol. 2,2.

G. Furnas et al., "Considerations for Information environments and the NaviQue Workspace," ACM DL 1998: 79-88 (2 pages).

G. Furnas et al., "MuSE: A Multiscale Editor," UIST 98. San Francisco, CA, 1998.

George W. Furnas List of publications from the DBLP Bibliography Server , available on Feb. 6, 2004, at: http://joinus.comeng.chungnam.ac.kr/~dolphin/db/indices/a-tree/f/Furnas:George_W=.html.

"Outliners.com: Semantic nets vs. outlines—TheBrain," available on Feb. 6, 2004, at: http://www.outliners.com/discuss/msgReader$581?mode=topic.

Re: accessify.com's review of RNIB relaunch, available on Feb. 6, 2004, at: http://lists.w3.org/Archives/Public/w3c-wai-ig/2003AprJun/1029.html.

"macromedia weblogs," available on Feb. 6, 2004, at: http://www.markme.com/mtadmin/mt-comments.cgi?entry_id=390.

"yahoo! Search Results for hierarchy collapsible interface," available on Feb. 6, 2004, at: http://search.yahoo.com/search?p=hiearchy+collapsible+interface&ei=UTF-8&fr=fp-tab-we...

"AmphetaDesk TODO," available on Feb. 6, 2004, at: http://cvs.sourceforge.net/viewcvs.py/amphetadesk/AmphetaDesk/docs/TODO?rev=1.51.

* cited by examiner

▼ directory 1 —— 305
 ▶ subtree 1 —— 310
350 —○ item 1 —— 315
345 —● item 2 —— 320
355 —• item 3 —— 325
 ▼ subtree 2 —— 330
345 —● item 4 —— 335
350 —○ item 5 —— 340

405 —▽ directory 1 — 305
 ▶ subtree 1 — 310
 ● item 2 —— 320
 • item 3 — 325
405 —▽ subtree 2 — 330
 ● item 4 — 335

505 —▷ directory 1 — 305
 ● item 2 — 320
 ● item 4 — 335

605 —▶ directory 1 — 305

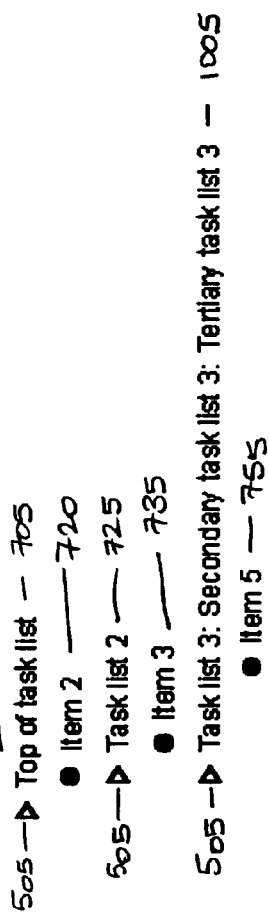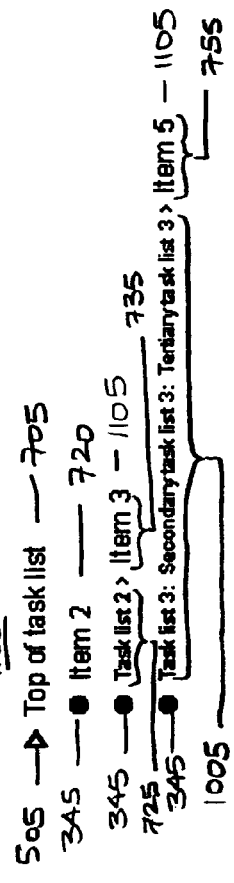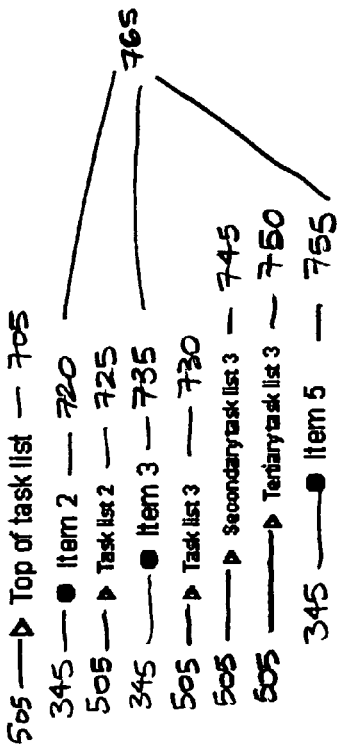

SYSTEM AND METHOD FOR PARTIALLY COLLAPSING A HIERARCHICAL STRUCTURE FOR INFORMATION NAVIGATION

FIELD OF THE INVENTION

The present invention generally relates to hierarchical structures. More specifically, the present invention relates to a dynamic display of hierarchical structures in a partially collapsed format such that user designated items are displayed, featured, or hidden as directed by a user.

BACKGROUND OF THE INVENTION

Information in computers is typically stored as items such as files, documents, objects, etc. Common practice is to organize and later locate items through the use of a hierarchical file structure. One well-known type of hierarchical file structure is organized as a "tree". In a tree structured file system, files are organized with a single root node referred to as the "root." One or more further nodes may then be connected directly to the root and would thus be referred to a "children" of the root node where the root node would be considered the "parent" node. One or more additional nodes may be subsequently connected to any other node in the tree in a similar parent-child relationship. In a typical electronic file storage system, each node that has at least one other child node connected to it is a "directory" of files. A "leaf" node is a node that has no other child node connected to it and is connected to the tree only by the parent node immediately above it. Leaf nodes may be empty subdirectories or files. A "sub-tree" is a particular portion or branch of the overall tree taken from a designated node and including all children underneath the designated node.

Although this technology has proven to be useful, it would be desirable to present additional improvements. Tree views of a hierarchical file structure work well for moderate amounts of information. However, a tree view does not scale well for hierarchical file structures comprising many items (either many sub-directories or many files). Both the "depth" of the tree, the number of parent-child node relationships, and the "breadth" of the tree, the number of sibling relationships, increase the overall complexity and thus reduce the efficacy of such hierarchic file systems. Such complex trees are typical. When expanding a large tree structure, a user can view only a relatively small portion of the large tree structure at any one time. Consequently, a user can focus only on a small section of the tree structure, losing contact with other parts of the structure that may be relevant. Further, conventional expansion or contraction of parts of a tree structure is an "all or nothing" operation. Expanding a large sub-tree results in a view that often shows some but not all of the direct children of that sub-tree thereby leaving out of view many of the items within the large sub-tree and potentially removing from view items at higher levels in the overall tree but which are not children of the sub-tree under consideration. Once collapsed, none of the large sub-tree is viewable by the user.

Conventional task lists, tables of content, or other hierarchically structured lists face similar display and navigation issues. For example, a user wishes to view a task list for a project that comprises a thousand items. The user opens or expands the task list thereby displaying all one thousand items. However, the user can see only the number of items that can fit within a viewing window. The user collapses the task list for the project, and all one thousand items are hidden.

What is therefore needed is a system, a computer program product, and associated method that allows users to selectively customize which information will be displayed in sub-trees, thereby allowing users to partially expand or collapse a sub-tree such that the desired items or files are displayed rather than all items or no items. The need for such a solution has heretofore remained unsatisfied.

SUMMARY OF THE INVENTION

The present invention satisfies the above described need and presents a system, a computer program product, and an associated method (collectively referred to herein as "the system" or "the present system") for partially expanding and collapsing a hierarchical structure for information navigation. The present system provides a dynamic mechanism for labeling items with one or more states representing the users' selective customization indicating which items they wish to retain in view or not. In one embodiment, item states comprise "hidden", "visible" (or "keep visible"), and "unmarked".

The hidden state is a user preference indication that these items may be hidden from view when the sub-tree to which they belong is partially expanded. A visible state is a user preference indication that these items are to remain in visible (in view) if the sub-tree to which they belong is partially collapsed. An unmarked state is applied to any items for which the user has not specified a particular visible/hidden preference. A fully expanded list or view of items displays all items in the selected sub-tree as previously described. Unlike prior work, there are now new alternatives to partially view sub-trees. A partially expended list or view of items in a sub-tree displays all items with a state set as visible and a state set as unmarked, removing items with a state set as hidden from the display. A partially collapsed list or view of a sub-tree displays only those items with a state set as visible. A fully collapsed list or view of items in a sub-tree hides all items. One advantage of the explicitly set "visible" state is that it works across several levels in the overall tree structure. More specifically, two or more items that are located in different positions in the tree, can be selectively made visible, while the remaining items are kept hidden. As an example, one item in the second level as well as an item in the tenth level can be kept visible while most everything else of the tree is hidden.

| | |
|---|---|
| Fully expanded sub-tree | Show all items that are children of sub-tree regardless of state settings, including unmarked items, items to keep hidden, items to keep visible. (This option is what standard file systems presently do). |
| Partially expanded sub-tree | Items with status of hidden are not shown; items with status that is either unmarked or marked as visible are shown. |
| Partially collapsed sub-tree | The hierarchy is mostly collapsed. Show only those items with a state marked as visible. (Different embodiments might also show the parents of any item that is marked visible.) |
| Fully collapsed sub-tree | The list is fully collapsed such that no children are visible regardless of state set. (This option is what standard file systems presently do). |

The present system allows users to customize the choice of items or nodes displayed in any sub-tree, thereby reducing the display size required for the sub-tree. The present system combines expansion with filtering, allowing users to partially collapse or partially expand any sub-tree structure.

The present system comprises collapsed lists with one or more focal points where each focal point is the item(s) designated by a state set as visible. Consequently, users can view several relevant sections of a hierarchical structure concurrently within a single display. The user can then interact directly with the one or more focal points without the necessity of additional navigation and operations of collapsing or expanding several portions of the hierarchical structure to accomplish a task. For example, a user may drag an item from one sub-tree to another sub-tree with only partial sub-trees displayed. Another example is related to adding one or more items to a folder that is located deep in the tree structure. Currently, all the levels or sub-trees leading to target location need to be expanded. However, this might move some of the desired items out of the user's view, requiring inconvenient navigation, scrolling, and/or waiting while the display changes what is viewable.

The present system provides a hierarchical structure display that allows a user to view designated portions of the hierarchical structure at all times, if desired. Any item in the hierarchy may be so designated by setting its state to "visible". The designated portions of the hierarchical structure are shown as visible items within the context of the overall hierarchical structure. Users may elect to retain visibility of only the item itself designated as visible or, alternatively, they may elect to retain visibility of the item designated as visible and its parent node(s) in the tree structure.

In one embodiment, the present system further adjusts the display of items for the partially expanded list and for the partially collapsed list to compress the visual representation of sub-trees into a single string of text, concatenating each sub-tree name for those trees which contain items marked visible. Sub-trees with unmarked items or hidden items are not displayed (as described above). For example, if sub-tree A has a further sub-tree B which in turn has a child item X with a status of "visible", this can be compressed into a single text string display of "Tree A: Tree B: Item X" rather than presenting each level on a distinct line with indentation as is the more traditional approach.

In one embodiment, the present system further adjusts the displayed size of items, making selected items more visually salient. The user specifies which items are displayed large and which are displayed small. This embodiment allows the display of less important items to consume less area of a display of a hierarchical structure. Unlike prior work in dynamically adjusting the font size of items based on cursor position, the present system relies on the user specified states to determine which items to render more salient and which are less salient, regardless of cursor position.

In a further embodiment, the size of font could be adjusted more dynamically based on a more continuous user specified dimension. For instance, if users elect to apply color encodings to items using a color wheel (or other user interface mechanism) as a means of indicating item importance, the various changes in hue values or RGB values could be mapped to font size. For instance, as the colors move from yellows to oranges to reds, the associated font sizes would increase. Likewise, a fixed series of values could be assigned where each value in the series maps to a particular decrease in font size. An importance rating scale from 1 to 5 could be mapped to 5 different font sizes where the most important items, for instance those rated "1", are the largest. Such mappings can be either explicitly user defined or can be defined by an automated process.

In another embodiment, items designated to a state set as "track status" by the user in a sub-tree can signal "upwards" in the hierarchical tree structure for attention by the user, if necessary. For example, items in a hierarchy may represent processes that require monitoring by a user. In this example, a process deep in the hierarchy may or may not be visible to user on the display at any given time. In such a case, the user had indicated that a change in the process status triggers a change in the item state to mark it as "visible" and thus it will then behave as described above. In particular, the present system allows an item or process to become visible in the hierarchy display without expanding the entire hierarchy or all sub-tree(s) to which it belongs. Consequently, the process can notify the user of a need for attention in, for example, an error situation. An obvious extension consistent with the intent of the present system is that users may authorize "agents" (automated computer programs or processes other than the user) to act on their behalf to designate items as "visible" such that these specific items will behave as described.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is an exemplary display of a fully expanded hierarchical structure as displayed by the partially collapsing hierarchical display system of FIGS. 1 and 2 with unmarked items and items marked "hidden" or "visible";

FIG. 4 is an exemplary display of the hierarchical structure of FIG. 3 partially collapsed by the partially collapsing hierarchical display system of FIGS. 1 and 2 to display unmarked items and visible items;

FIG. 5 is an exemplary display of the hierarchical structure of FIG. 3 partially collapsed by the partially collapsing hierarchical display system of FIGS. 1 and 2 to display visible items;

FIG. 6 is an exemplary display of the hierarchical structure of FIG. 3 fully collapsed by the partially collapsing hierarchical display system of FIGS. 1 and 2;

FIG. 10 is an exemplary display of a partially collapsed task list as displayed by the partially collapsing hierarchical display system of FIGS. 1 and 2 showing only visible items within a structural context of the task list such that directories of displayed items are concatenated together;

FIG. 11 is an exemplary display of a partially collapsed task list as displayed by the partially collapsing hierarchical display system of FIGS. 1 and 2 showing only visible items within a structural context of the task list such that directories of displayed items are concatenated together and displayed on a same line with a single associated visible item;

FIG. 12 is an exemplary display of a partially collapsed task list as displayed by the partially collapsing hierarchical display system of FIGS. 1 and 2 showing only visible items within a structural context of the task list such that the structural context is displayed in smaller font than the visible item;

DETAILED DESCRIPTION OF PREFERRED EMBODIMENTS

The following definitions and explanations provide background information pertaining to the technical field of the present invention, and are intended to facilitate the understanding of the present invention without limiting its scope:

Node: A point or vertex in a graph or hierarchical structure.

Root node (Root): A node with no parent but typically with children.

Leaf node (Leaf): A node connected to the tree through a parent but with no children.

Sub-tree: A sub-tree is a particular portion or branch of the overall tree taken from a designated node and including all children underneath the designated node.

Level in a tree: A level is the number of nodes or, in particular, sub-trees, necessary to traverse from the root in order to reach a target destination node. Nodes that are characterized as being on the same "level" are equal distance from the root node in terms of the number of sub-trees traversed in order to reach the target.

Hierarchy: A hierarchy is a particular structure used to organize objects into categories or clusters. Typically a hierarchy is comprised of a set of categories (with each category containing one or more objects) that are further divided into sub-categories which themselves may be further sub-divided thereby creating a multi-level structure. However, for the purposes of this invention, in its simplest instance a hierarchy can be a flat linear list (i.e., only one category or division).

Tree: A hierarchical structure that is made up of nodes. Nodes are connected by edges from one node (parent) to another (child). A single node at apex of the tree is known as the root node, while the terminus of a path in the opposite direction is a leaf.

Figure 1:
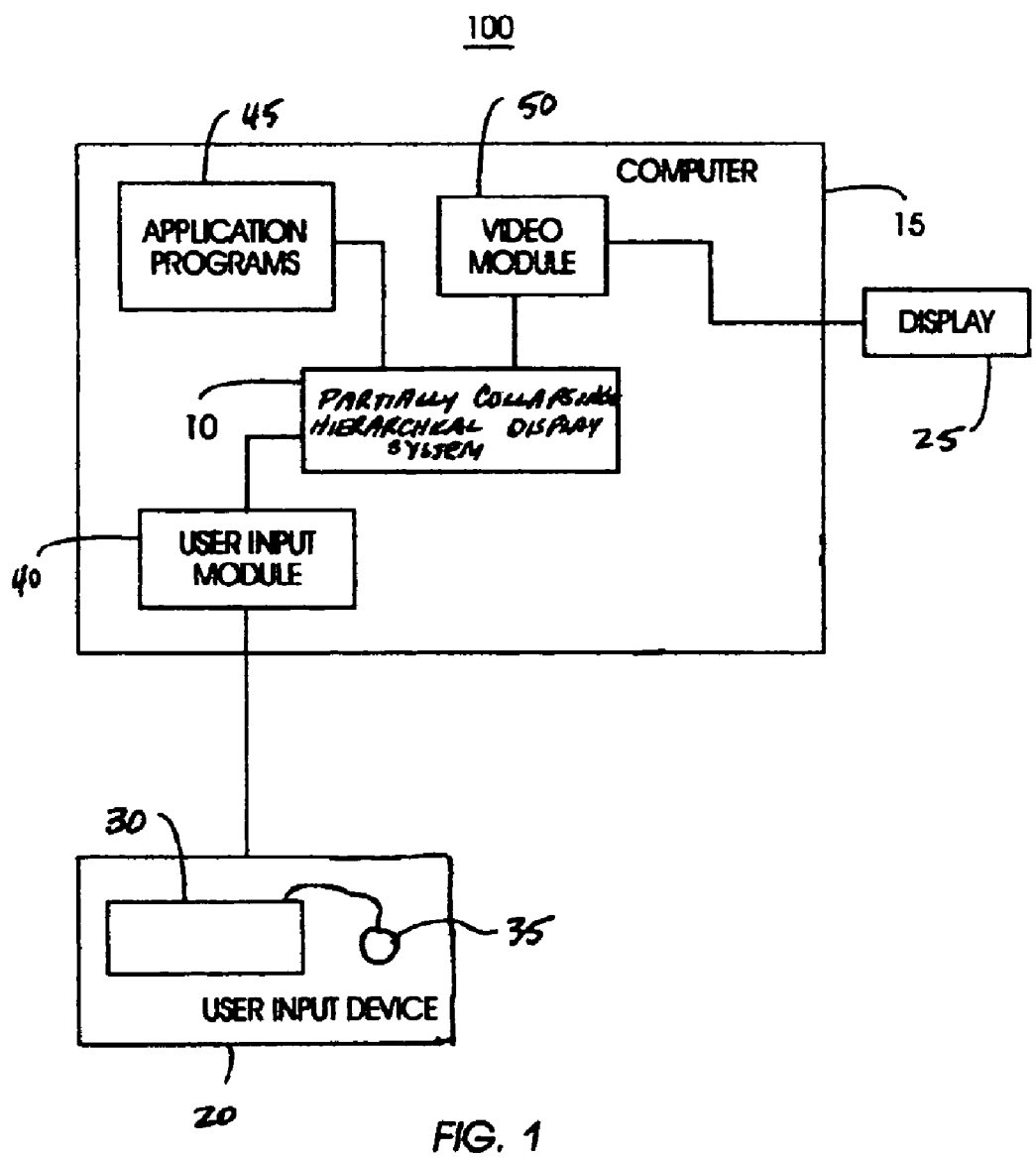
FIG. 1 is a schematic illustration of an exemplary operating environment in which a partially collapsing hierarchical display system of the present invention can be used.

FIG. 1 illustrates an exemplary high-level architecture of a computer system 100 comprising a system and method for partially collapsing a hierarchical structure for information navigation ("system 10"). System 10 comprises a software programming code or computer program product that is typically embedded within, or installed on a computer. Alternatively, system 10 can be saved on a suitable storage medium such as a diskette, a CD, a hard drive, or like devices.

Generally, the computer system 100 comprises a computer 15, a user input device 20, and a display 25. The computer system 100 may be used, for example, by a "user", also called an "operator". The user input device 20 comprises an operator input device with an element sensitive to pressure, physical contact, or other manual activation by a human operator. In the particular embodiment illustrated in FIG. 1, the user input device 20 comprises a keyboard 30 and a mouse 35.

Although the software programming associated with the user input device 20 may be included with the user input device 20, the particular example of FIG. 1 shows the necessary input device software implemented in a user input module 40. The user input module 40 may be included solely in the computer 15, the user input device 20, or a combination of the two, depending upon the particular application.

The computer 15 comprises one or more application programs 45, the user input module 40, system 10, and a video module 50. Although a computer such as computer 15 clearly comprises a number of other components in addition those of FIG. 1, these components are omitted from FIG. 1 for ease of illustration.

The video module 50 comprises a product that generates video signals representing images. These signals are compatible with the display 25 and cause the display 25 to show the corresponding images. The video module 50 may be provided by hardware, software, or a combination. As a more specific example, the video module, 50 may be a video display card, such as an SVGA card.

The application programs 45 comprise various programs running on the computer 15, some of which present information in a hierarchical structure. Examples of application programs 45 include an operating system in which items or files are organized in a hierarchical file structure, a task management program, a project management program, a word processor document with a table of contents, etc.

Figure 2:
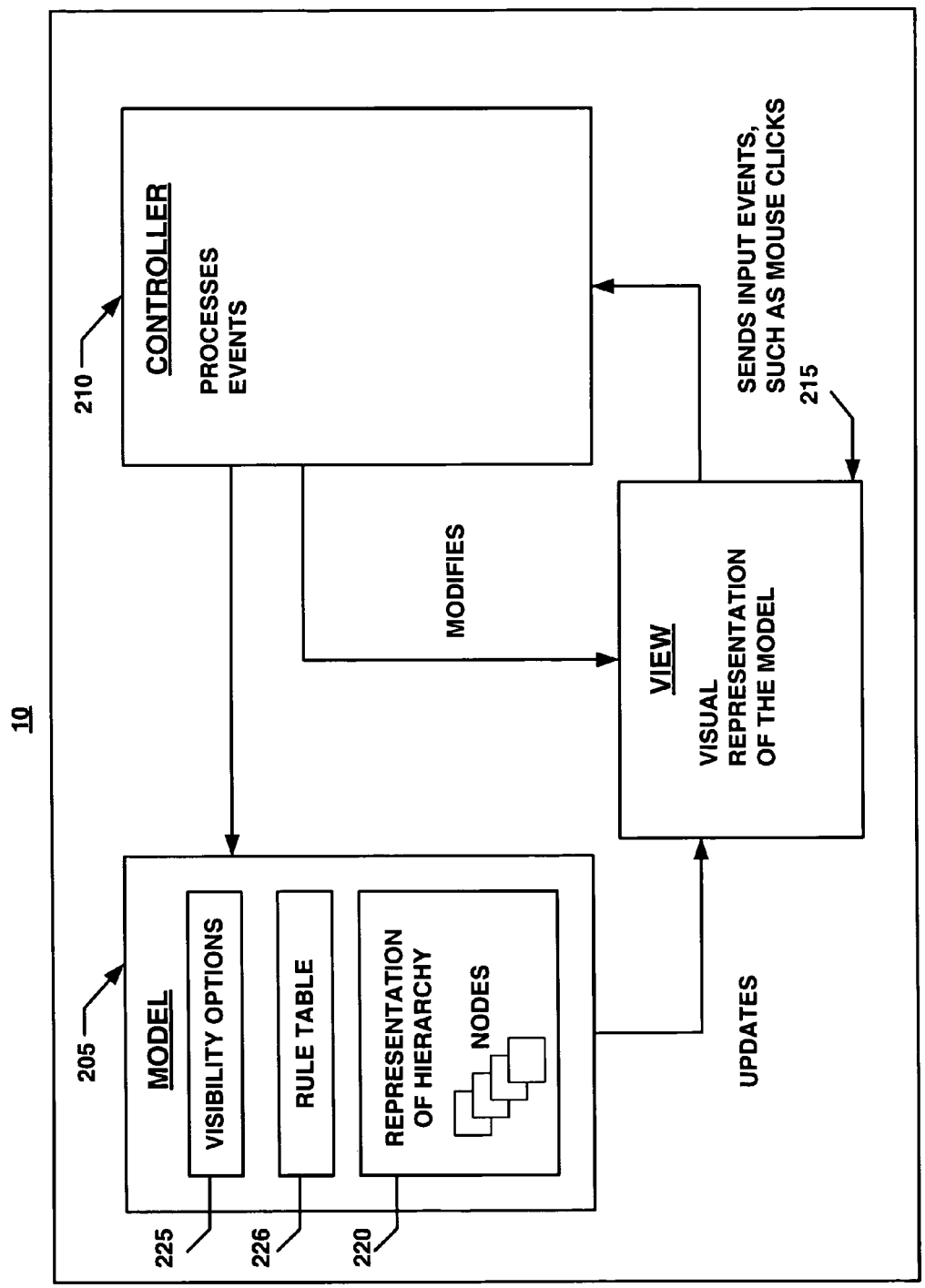
FIG. 2 is a diagram of the high-level architecture of the partially collapsing hierarchical display system of FIG. 1.

FIG. 2 illustrates the control and data flow among the three main components for system 10. These are: a model 205, a controller 210, and a view 215. Constructing a user interface from these three main components as described below is state of the art. The model 205 is an object representing data 220 such as the structure of the hierarchy, data contained in objects in the hierarchy and the current state of expansion of each node. It also may contain a visibility threshold or cutoff 225, if the embodiment under consideration makes use of this data, as well as a rule table 226.

The view 215 represents a form of visualization instantiation of the state of the model. One common embodiment of the view would render a hierarchy as a tree structure containing folders and nodes. The controller 210 offers facilities to change the state of the model through user interaction. User events, such as mouse clicks are received by the view 215. The view sends the event to the controller 210, which causes the appropriate change in the model 205 and the view 215 is updated.

For instance, when the user clicks on the representation of a folder in the view 215 the following sequence of activities are triggered: The view 215 notifies the controller 210 that a specific folder has been clicked (including information on which folder). The controller 210 interprets this mouse click and changes that folder's state in the model 205 to expanded or collapsed, as appropriate. The controller 210 would further notify the view 215 that a change in the model 205 has taken place. This causes the view 215 to update itself to visually reflect that change (to redraw).

A different sequence of activities occurs in the case of non-user events, such as when some internal process changes the model 205. An example is when items in the hierarchy represent, for instance, automated processes that are being monitored. An error occurring in the monitored process might change the data of its associated node in the hierarchy to cross some visibility threshold 225 (stored in the model 205) such that the visibility of that node needs to be updated in the view. In this case, the model 205 directly notifies the view 215 that a refresh of the visual representation is required causing the view 215 to redraw.

System 10 provides a mechanism for labeling items with one or more states. In one embodiment, states comprise "hidden", "visible" and "unmarked". FIG. 3 illustrates a fully expanded list 300 that comprises a directory 1, 305. In fully expanded form, directory 1, 305, comprises a sub-tree 1, 310, an item 1, 315, an item 2, 320, an item 3, 325, and a sub-tree 2, 330. The sub-tree 1, 310, is shown fully collapsed. The sub-tree 2, 330, is expanded; the sub-tree 2, 330 comprises an item 4, 335, and an item 5, 340. The user designates the item 2, 320, and the item 4, 335, as "visible" items, as indicated in this particular embodiment by a filled indicator 345. The user designates the item 1, 315, and the item 5, 340, as "hidden" items, as indicated in this particular embodiment by an open indicator 350. The user has no designation for item 3, 325, thus it is left "unmarked", as indicated in this particular embodiment by a small dot. Any type of indicator may be used by system 10 to designate a visible, hidden, or unmarked item, provided the indicators have some distinguishable difference.

FIG. 4 illustrates a partially expanded list 400 of the directory 1, 305, that displays all visible and unmarked items. The partially collapsed list 400 displays the sub-tree 1, 310 and the sub-tree 2, 330, and item 2, 320, and the item 4, 335, that the user has designated as visible items. The partially collapsed list 400 also displays the item 3, 325, which is not marked. Compared to the fully expanded list 300, the partially collapsed list 400 removes from the display of items in the directory 1, 305, those items that are designated by the user as of less importance through the "hidden" designation. The indicator 405 is altered to reflect that there are hidden items not currently in view in both directory 1, 305 and in sub-tree 2, 330. The structural information, sub-tree 1, 310, and sub-tree 2, 330) may be optionally hidden from view.

FIG. 5 illustrates a further collapsed list 500 of the directory 1, 305, that displays all visible items. The further collapsed list 500 displays the item 2, 230, and the item 4, 335, that the user has designated as visible items. Compared to the fully expanded list 300 and the partially collapsed list 400, the further collapsed list removes from the display of items in the directory 1, 305, those items that are not designated as "visible" by the user. In this embodiment, the structural information may be hidden from view. The indicator, 505, shows that the directory 1, 305 is mostly collapsed but may contain hidden or unmarked items not currently in view.

FIG. 6 illustrates a fully collapsed list 600 of the directory 1, 305, that removes from the display all items in the directory 1, 305. The indicator, 605, shows that the directory 1, 305, may have content items marked visible that are not in view.

Figure 7:
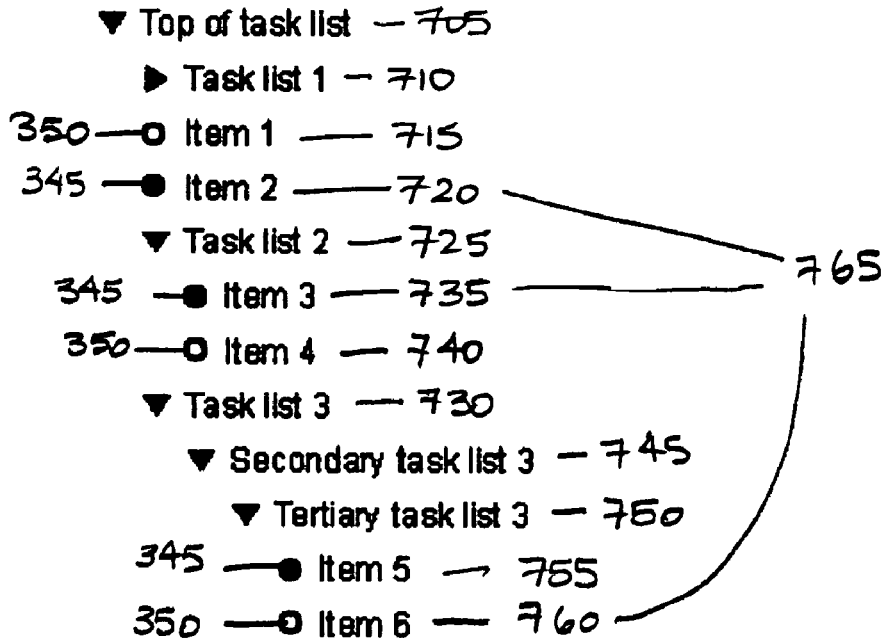
FIG. 7 is an exemplary display of a fully expanded task list as displayed by the partially collapsing hierarchical display system of FIGS. 1 and 2 with items marked "hidden" or "visible"

FIG. 7 illustrates a hierarchical structure 700 in expanded form of items such as that of a task list. The root of the hierarchical structure 700 is a top of task list, 705. The top of task list, 705, comprises a task list 1, 710, an item 1, 715, an item 2, 720, a task list 2, 725, and a task list 3, 730. The task list 1, 710, is collapsed. The task list 2, 725, is expanded, displaying an item 3, 735, and an item 4, 740. The task list 3, 730, is expanded, displaying a secondary task list 3, 745, and a tertiary task list 3, 750. The tertiary task list 3, 750, comprises an item 5, 755, and an item 6, 760.

The item 2, 720, the item 3, 735, and the item 5, 755, are designated as visible (collectively referenced as visible items 765), as indicated in this embodiment by the filled indicator 345. The item 1, 715, the item 4, 740, and the item 6, 760, are designated as hidden, as indicated in this embodiment by the open indicator 350. When used in a task list, designating an item as visible can confer a level of importance or priority to an item. In one embodiment, system 10 comprises additional levels of visibility or importance, allowing the user to further customize a display of a hierarchical structure.

Figure 8:
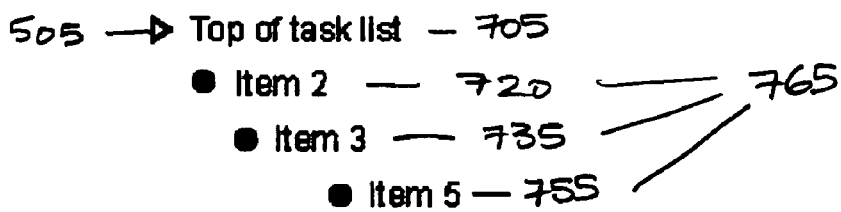
FIG. 8 is an exemplary display of a partially collapsed task list as displayed by the partially collapsing hierarchical display system of FIGS. 1 and 2 showing only visible items.

FIG. 8 illustrates one embodiment for displaying a partially collapsed hierarchical structure 800. The embodiment of FIG. 8 maintains the visible items 765 in positions indicating their respective levels within the hierarchical structure where levels are represented by extent of indentation. The indicator, 505, reflects that Top of task list, 705, contains items that hidden and/or unmarked that are not currently in view.

Figure 9:
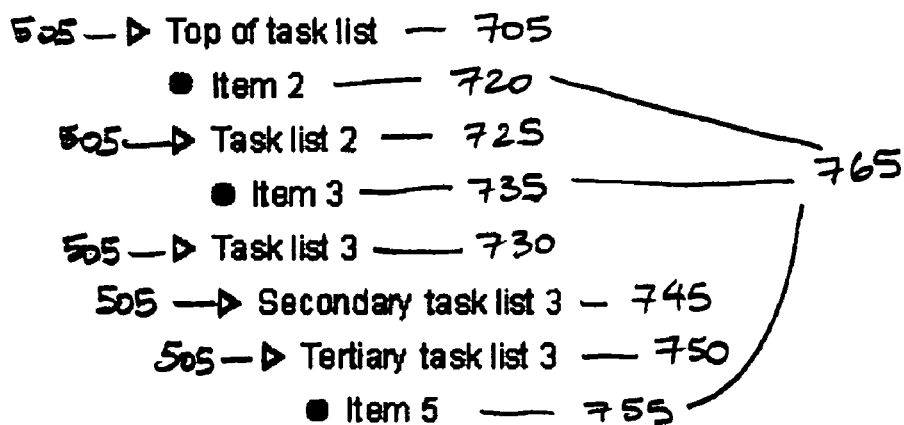
FIG. 9 is an exemplary display of a partially collapsed task list as displayed by the partially collapsing hierarchical display system of FIGS. 1 and 2 showing only visible items within a structural context of the task list.

FIG. 9 illustrates another embodiment for displaying a partially collapsed hierarchical structure 900. The embodiment of FIG. 9 lists each of the visible items 765 in addition to their respective parent task lists: the task list 2, 725, the task list 3, 730, the secondary task list 3, 745, and the tertiary task list 3, 750. Each of these task lists is marked with a collapsed indicator 505, indicating that additional items exist within that task but are not displayed. These would be items that are not expressly marked as "visible".

FIG. 10 illustrates a further embodiment for displaying a partially collapsed hierarchical structure 1000. This embodiment saves screen space by concatenating subdirectory titles on a single line (or on as few lines as possible) to display the relative location of visible items. For example, the relative location of the item 5, 755, is shown by concatenating the task list 3, 730, the secondary task list 3, 745, and the tertiary task list 3, 750, into one subdirectory title: task list 3: secondary task list 3: tertiary task list 3, 1005 (also referenced herein as the concatenated task list, 1005). As in FIG. 9, 900, this embodiment, 1000, shows all visible items, namely item 2, 720, item 3, 735 and item 5 but in less space. The task lists, 705, 720, and concatenated task list, 1005, have indicators, 505, reflecting that there are further hidden and unmarked items not in view.

FIG. 11 illustrates another embodiment for displaying a partially collapsed hierarchical structure 1100. This embodiment further saves screen space by listing visible items themselves next to the concatenated task list indicating the relative location of the visible item, 1105. For example, the item 3, 735, is listed to the right of the task list 2, 725, which is the subdirectory title for the item 3, 735. The item 5, 755, is listed to the right of the concatenated task list, 1005. In this embodiment, the task list indicators, 505, are replaced with the item visibility indicator, 345, which takes functional priority.

FIG. 12 illustrates another embodiment for displaying a partially collapsed hierarchical structure 1200 where the task lists: task list 2, 725, task list 3, 730, task secondary task list 3, 745, and tertiary task list 3, 750 are displayed in reduced font sizes thereby further saving screen space. The partially collapsed hierarchical structure 1200 is similar to the partially collapsed hierarchical structure 900 with the exception that these above task lists are displayed in smaller font than the visible items 765. The partially collapsed hierarchical structure 1200 features the visible items 765, with indicators, 345, while indicating task lists that contain further items marked hidden or unmarked by indicator, 505.

Figure 13:
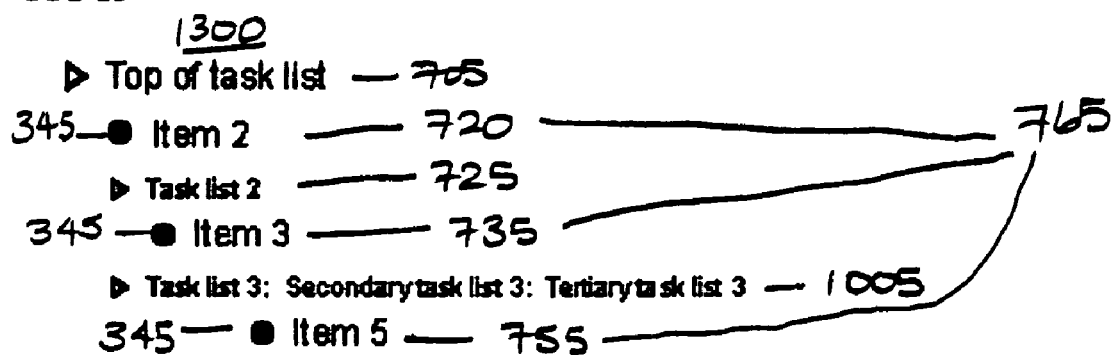
FIG. 13 is an exemplary display of a partially collapsed task list as displayed by the partially collapsing hierarchical display system of FIGS. 1 and 2 showing only visible items within a structural context of the task list such that directories of displayed items are concatenated together and displayed in smaller font than the visible item.

FIG. 13 illustrates a further embodiment for displaying a partially collapsed hierarchical structure 1300 using these reduced font sizes for the display of concatenated tasks lists. The partially collapsed hierarchical structure 1200 is similar to the partially collapsed hierarchical structure 1000 except that the task list 2, 725, and the concatenated task list, 1005, are displayed in a smaller font than the visible items 765, marked by the indicators, 345. The partially collapsed hierarchical structure 1300 saves screen space and features the visible items 765 within the partially collapsed hierarchical structure 1300.

Figure 14:
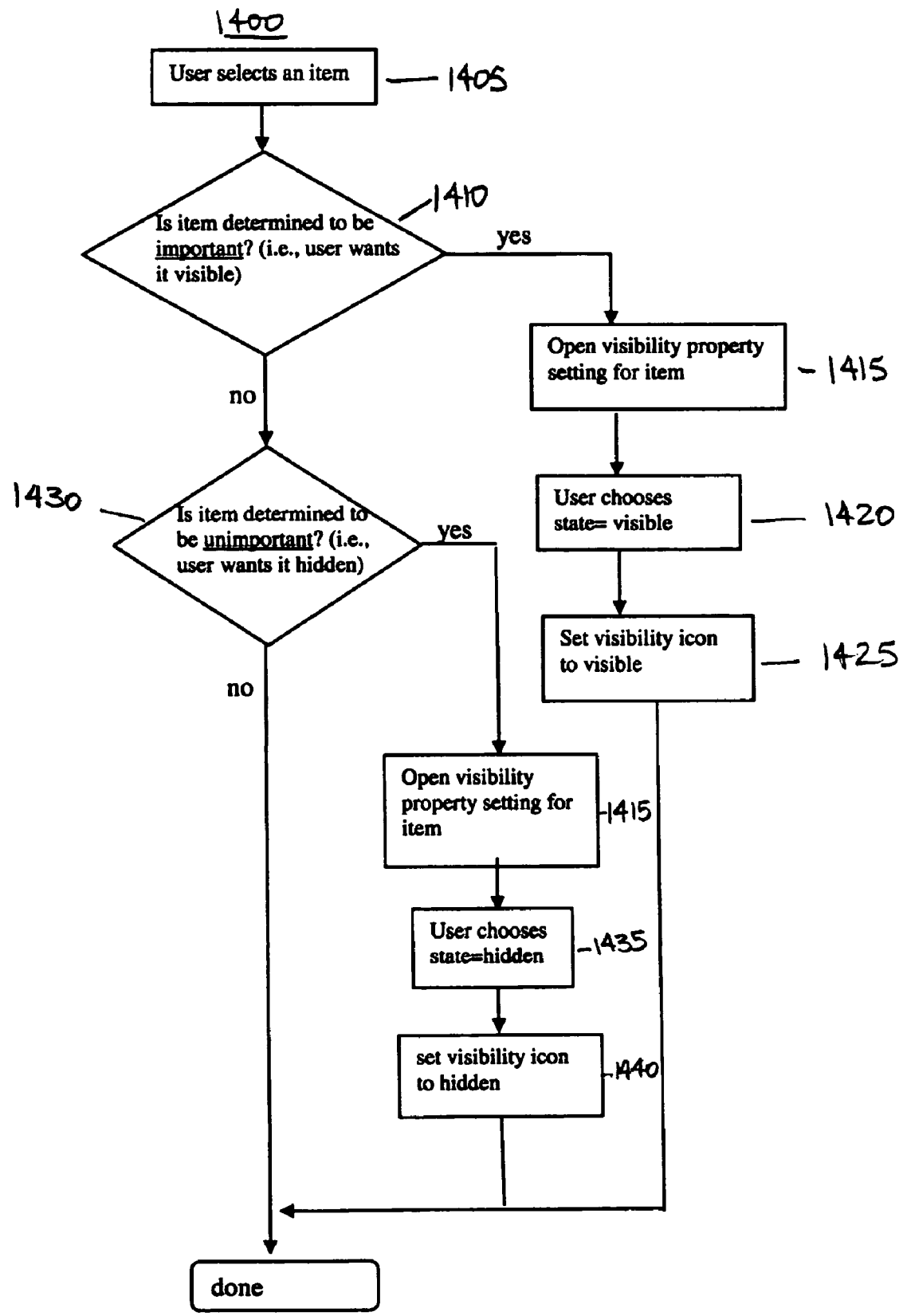
FIG. 14 is a process flow chart illustrating a method of operation of the partially collapsing hierarchical display system of FIGS. 1 and 2 in dynamically designating states for items in a hierarchical structure.

FIG. 14 illustrates one embodiment of a process 1400 that would be applied by a user in order to mark items as visible, hidden, and unmarked. Applying the example used in FIG. 3, the fully expanded list 300, the user decides item 2, 320 and item 4, 335 are important and thus wants to mark them visible. The user determines item 1, 315 and item 5, 340 are less important and thus wants to mark them hidden. The user determines that item 3, 325 is undecided and thus wants to leave it unmarked. Initially, all items are considered unmarked by default. The user selects each item in turn, step 1405, and determines whether or not the item is to be marked visible, step 1410. If the item is to be visible the user first opens the visibility property for that item, step 1415. This could be achieved by any one of several interactions methods, for instance, by clicking directly on the visibility indicator icons, by using the right mouse button while over the item name, or through setting attributes on a property specification screen for the selected item. The user chooses a state of "visible", step 1420. In choosing this state value, the system updates the visibility indicator, step 1425, to reflect the visible marked status, 345. For instance, this procedure would be applied to items 2, 320, and item 4, 335. If the user determines that the current item is to be marked "hidden", step 1430, the user again opens the visibility property setting, step 1415, sets the state to "hidden", step 1435, and the system updates the visibility indicator, step 1440, to reflect a status of hidden, 350. For instance, this procedure would be applied to item 1, 315 and item 5, 340 as shown in FIG. 3.

Figure 15:
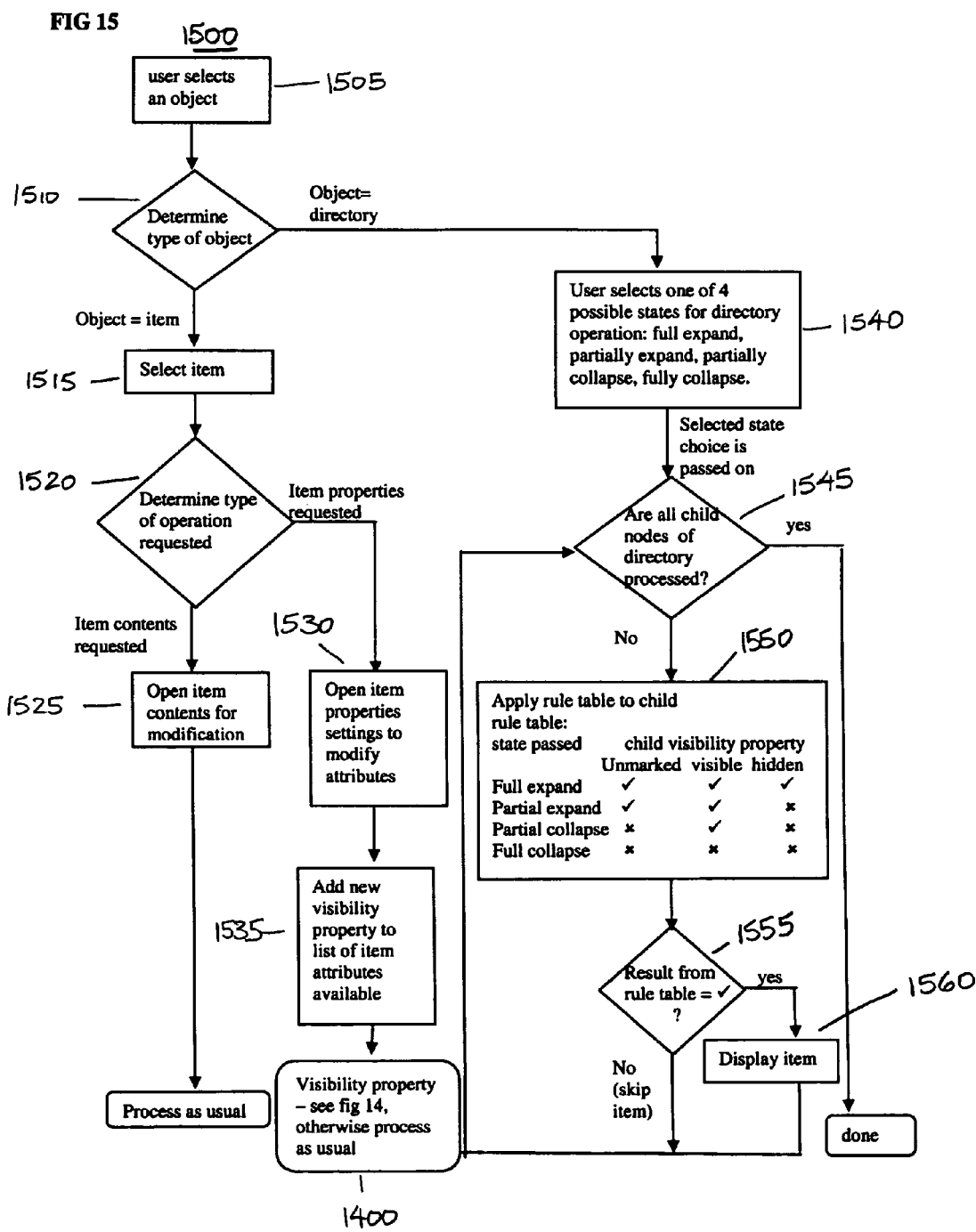
FIG. 15 is a process flow chart illustrating a method of operation of the partially collapsing hierarchical display system of FIGS. 1 and 2 in partially collapsing a hierarchical structure.

FIG. 15, illustrates a process 1500 exemplifying a method of operation of the partially collapsing hierarchical display system of FIGS. 1 and 2 in partially collapsing a hierarchical structure. In particular, the user selects an object, step 1505, (the view, 215 (FIG. 2) would process this selection. The controller, 210 (FIG. 2) determines the type of object, step 1510, and if an item was selected, step 1515, the item is shown as selected (the view 210 updates). The controller 210 further determines what type of operation needs to be carried out, step 1520, based on the type of user request. For instance, users may want to edit the item contents itself, step 1525, or may want to set/change properties of the item, step 1530.

If the user wishes to set or change the properties of the item then a display of these settings is presented, step 1530. These properties settings now include a new item, a visibility property, step 1535, which has several values possible, for instance, hidden, visible, or unmarked. (FIG. 14 describes the process for setting these values). The model 205 (FIG. 2) stores information about the state changes requested by the controller 210.

Alternatively, the user has not selected an item but rather has selected a directory. In this case, step 1540, one of 4 possible changes to the directory's state may be requested by the user through their choice of selection options: fully expand, partially expand, partially collapse, fully collapse. The user's choice is passed to the controller, 210, which then determines whether or not to display each child node within the parent directory, 1545. The controller 210 updates the model 205 for that directory appropriately. Each child node within the directory is considered by the controller 210 until all nodes have been determined. For each child node, its visibility property is looked up and a rule on whether to display or not is determined, step 1550.

In this particular embodiment, these rules are represented in the rule table 226 (FIG. 2), step 1550, however, they may be determined dynamically, and they may be stored in another data format such as an array, or they may be otherwise computed. The result from the rule table, step 1555, determines whether or not to display the item under consideration, step 1560. The model 205 for each node, is updated to reflect the state. The view 215 then shows the node displayed accordingly, This is done for all children nodes of the selected parent directory.

System 10 allows display of items in manner that hides items that are not germane to the current visual needs of the user. System 10 makes the outcome of an expand action or a collapse action dependent not only on the content of the hierarchical structure but also on the current work context of the user.

System 10 further changes the visual importance of an item. For example, items that are considered less important are shown smaller, using less screen space. Displaying the items smaller allows a user to keep track of an increased number of items while retaining the salience of more important items since they are presented in larger more visible fonts, as for a task list.

When applied to a task list, system 10 can be used to help the user focus on important items. For example, task items may have an associated priority of 1 to 5, with 1 being the most important. The user may assign a visible criterion to all task items with high priority, for example, a priority of 1 or 2. Consequently, only high priority items are displayed when the user selects a partially collapsed hierarchical structure as displayed in FIG. 8, FIG. 9, FIG. 10, FIG. 11, FIG. 12, or FIG. 13. In a further embodiment, system 10 can assign a different visible criterion to task items with a priority of 1 than that assigned to task items with a priority of 2. System 10 then displays in a partially collapsed hierarchical structure task items of priority 1 more prominently than task items of priority 2. Task items with priority 1 may be featured by, for example, a larger font. Each decreasing level of importance would be reflected by a corresponding decrease in font size. Similarly, any user-applied criterion can be correspondingly mapped to dynamic changes in font size. For instance, in another embodiment, items having due dates of today can be displayed in the largest font size, while items having due dates later this week appear in a smaller font size, and items having due dates beyond this week (e.g., next week, next month) are displayed in a third even smaller font size.

In another embodiment, system 10 can provide partially collapsed hierarchical structures that reflect a global basis as well as a contextual basis and a local basis. For example, system 10 shows a user all task items for a current day that have a priority of 1, 2, or 3. System 10 further only shows a user tasks for the next day that have a priority of 1. System 10 consequently dynamically and automatically adjusts the amount of detail shown in the partially collapsed hierarchical structure. This dynamically and automatically adjusted partially collapsed hierarchical structure shows only the appropriate amount of the most salient information to the user, allowing the user to easily comprehend the information in the hierarchical structure.

Several nodes in a hierarchy aggregated into a summary node: As an example, the tree is a structure containing tasks to do, for example a sub-tree might be called "organize trip to Boston" with the subitems: book flight, book hotel, prepare speech and send off copies of presentation. The flight, hotel, and speech are marked as important. If the hotel and flight are taken care of, and the sub-tree is collapsed the structure might show as "organize trip to Boston (2 important items completed, 1 important item open)". It should be noted that the 3 important items are not actually listed. This is another way to show some information about what is important in a collapsed sub-tree. In one implementation, the long textual message in parenthesis could be replaced by symbols.

Conventional hierarchical tree structures employ a strict sorting order: The idea here points at situations where the user has a long list of subdirectories as in a typical file system with many folders. Frequently, because they are many folders and directories, it is not possible to keep several key folders in view at the same time to interact with them, regardless of existing methods for sorting the display. For instance, if the folders are sorted alphabetically, they are likely to be many items separating folder A from folder Z, such that folder A and folder Z cannot be displayed at the same time on the same screen. If the user wishes to interact with these two folders (like drop files from one into the other or move one folder into the other folder) a number of additional intermediate navigation and selection operations are required to move from one view where folder A can be seen to a different view where folder Z can be seen. Such additional operations introduce both errors and time delays in the user's desired task goal of working with folder A and folder Z at the same time. According to the present invention, it would be possible to make A and Z simultaneously "visible", collapsing less relevant information thereby removing it from view.

It is to be understood that the specific embodiments of the invention that have been described are merely illustrative of certain applications of the principle of the present invention. Numerous modifications may be made to the system and method for partially collapsing a hierarchical structure for information navigation described herein without departing from the spirit and scope of the present invention. Moreover, while the present invention is described for illustration purpose only in relation to hierarchical structures such as task lists and hierarchical file systems, it should be clear that the invention is applicable as well to, for example, to any form of data presented in a hierarchical structure or a structure relying on categorization or clustering.

What is claimed is:

1. A method of displaying a plurality of items in a hierarchical tree structure, the method comprising:
    selecting at least one child item in a plurality of items residing in a hierarchical tree structure, wherein the at least one child item is a child of at least one other item in the plurality of items;
    selectively associating, in response to selecting the at least one child, a visibility state with the at least one child item;
    modifying a current view of the hierarchical tree structure by one of
        collapsing at least a viewable portion of the hierarchical tree structure, wherein the viewable portion comprises at least the at least one child item and its immediate parent item, and
        expanding the portion of the hierarchical tree structure; and
    dynamically adjusting the current view which has been modified, wherein the dynamically adjusting includes applying the visibility state that has been selectively associated with the at least one child item to its immediate parent in response to i) collapsing the viewable portion at a parent of the immediate parent of the at least one child item and ii) the visibility state being set to visible; and
    displaying the at least one child item simultaneously with its immediate parent in response to i) collapsing the viewable portion at the parent of the immediate parent of the at least one child item; ii) the visibility state being set to visible; and iii) applying the visibility state to the immediate parent.

2. The method of claim 1, wherein the dynamically adjusting further comprises effecting a visual presentation of the items.

3. The method of claim 2, wherein the effecting the visual presentation of the items comprises modifying at least one of: font size, typographic style, color, and symbolic icon.

4. The method of claim 1, wherein the modifying further comprises one of:
    fully expanding the hierarchical structure; and
    fully collapsing the hierarchical structure.

5. The method of claim 4, wherein the fully expanding sets the visibility state to full visibility for all the items in the plurality of items regardless of an individual visibility state associated with the items.

6. The method of claim 4, wherein the fully collapsing sets the visibility state to no visibility for all the items in the plurality of items regardless of an individual visibility state associated with the items.

7. The method of claim 1, further comprising:
    indenting at least some of the items in the plurality of items for display in context of the hierarchical tree structure.

8. The method of claim 7, wherein at least some of the items are shown in context of the hierarchical tree structure by listing subdirectory titles in addition to visible items.

9. The method of claim 1, wherein when the viewable portion is expanded, the dynamically adjusting further comprises:
    concatenating at least the one item and its immediate parent on a single line in response to: i) collapsing the viewable portion and ii) the visibility state being set to visible.

10. The method of claim 9, wherein each of the items is displayed on a separate line along with corresponding parent directory title.

11. The method of claim 9, wherein each of the items is displayed concatenated with corresponding parent directory titles.

12. The method of claim 1, wherein the dynamically adjusting further comprises:
    automatically reducing a font of at least the one item and its immediate parent in response to: i) collapsing the viewable portion and ii) the visibility state being set to visible.

13. The method of claim 1, further comprising selectively and automatically modifying the visibility state in response to an external process.

14. The method of claim 13, wherein selectively and automatically modifying the visibility state is in response to at least one of the following conditions of the external process: due date, successful execution, or encountering particular error conditions.

15. The method of claim 1, wherein when the viewable portion is expanded, the dynamically adjusting further comprises:
    hiding the one item in the viewable portion in response to the visibility state being hidden;
    displaying the immediate parent of the one item; and dynamically changing a visual indicator associated with the viewable portion to indicate that the one item is hidden.

16. The method of claim 1, further comprising:
displaying other items in the plurality of items associated with a visibility status of either unmarked or visible.

17. The method of claim 1, wherein the visual indicator is associated with the immediate parent.

18. An information processing system for displaying a plurality of items in a hierarchical tree structure, the information processing system comprising:
a memory; and
a processor communicatively coupled to the memory, wherein the processor is configured to perform a method comprising:
receiving a selection of at least one child item in a plurality of items residing in a hierarchical tree structure, wherein the at least one child item is a child of at least one other item in the plurality of items;
selectively associating, in response to receiving the selection of the at least one child, a visibility state with the at least one child item;
modifying a current view of the hierarchical tree structure by one of
collapsing at least a viewable portion of the hierarchical tree structure, wherein the viewable portion comprises at least the at least one child item and its immediate parent item, and
expanding the portion of the hierarchical tree structure; and
dynamically adjusting the current view which has been modified, wherein the dynamically adjusting includes
applying the visibility state that has been selectively associated with the at least one child item to its immediate parent in response to i) collapsing the viewable portion at a parent of the immediate parent of the at least one child item and ii) the visibility state being set to visible; and
displaying the at least one child item simultaneously with its immediate parent in response to i) collapsing the viewable portion at the parent of the immediate parent of the at least one child item; ii) the visibility state being set to visible; and iii) applying the visibility state to the immediate parent.

19. The information processing system of claim 18, wherein the method further comprises:
indenting at least some of the items in the plurality of items for display in context of the hierarchical tree structure.

20. The information processing system of claim 19, wherein at least some of the items are shown in context of the hierarchical tree structure by listing subdirectory titles in addition to visible items.

21. A computer readable storage medium for displaying a plurality of items in a hierarchical tree structure, the computer readable storage medium comprising instructions embedded thereon for performing a method comprising
receiving a selection of at least one child item in a plurality of items residing in a hierarchical tree structure, wherein the at least one child item is a child of at least one other item in the plurality of items;
selectively associating, in response to receiving the selection of the at least one child, a visibility state with the at least one child item;
modifying a current view of the hierarchical tree structure by one of
collapsing at least a viewable portion of the hierarchical tree structure, wherein the viewable portion comprises at least the at least one child item and its immediate parent item, and
expanding the portion of the hierarchical tree structure; and
dynamically adjusting the current view which has been modified, wherein the dynamically adjusting includes
applying the visibility state that has been selectively associated with the at least one child item to its immediate parent in response to i) collapsing the viewable portion at a parent of the immediate parent of the at least one child item and ii) the visibility state being set to visible; and
displaying the at least one child item simultaneously with its immediate parent in response to i) collapsing the viewable portion at the parent of the immediate parent of the at least one child item; ii) the visibility state being set to visible; and iii) applying the visibility state to the immediate parent.

22. The computer readable storage medium of claim 21, wherein the method further comprises:
indenting at least some of the items in the plurality of items for display in context of the hierarchical tree structure.

23. The computer readable storage medium of claim 21, wherein at least some of the items are shown in context of the hierarchical tree structure by listing subdirectory titles in addition to visible items.

24. The computer readable storage medium of claim 21, wherein when the viewable portion is expanded, the dynamically adjusting further comprises:
concatenating at least the one item and its immediate parent on a single line in response to: i) collapsing the viewable portion and ii) the visibility state being set to visible.

* * * * *